United States Patent
Zhou et al.

(10) Patent No.: US 10,664,544 B2
(45) Date of Patent: May 26, 2020

(54) INFORMATION DISPLAY METHOD, DISPLAY SERVER, SOCIAL APPLICATION CLIENT AND SYSTEM

(71) Applicant: TENCENT TECHNOLOGY (SHENZHEN) COMPANY LIMITED, Shenzhen, Guangdong (CN)

(72) Inventors: You Zhou, Shenzhen (CN); Yi Xie, Shenzhen (CN); Dan Yang, Shenzhen (CN); Jia Qu, Shenzhen (CN); Bing Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 342 days.

(21) Appl. No.: 15/796,543

(22) Filed: Oct. 27, 2017

(65) Prior Publication Data
US 2018/0068029 A1    Mar. 8, 2018

Related U.S. Application Data

(63) Continuation of application No. PCT/CN2016/082973, filed on May 23, 2016.

(30) Foreign Application Priority Data

Aug. 13, 2015    (CN) .......................... 2015 1 0496334

(51) Int. Cl.
*G06F 3/14*    (2006.01)
*G06F 16/955*    (2019.01)
(Continued)

(52) U.S. Cl.
CPC ........ *G06F 16/9558* (2019.01); *G06F 3/0481* (2013.01); *G06F 3/14* (2013.01);
(Continued)

(58) Field of Classification Search
CPC ....... G06F 16/9558; G06F 3/0481; G06F 3/14
See application file for complete search history.

(56) References Cited

U.S. PATENT DOCUMENTS

2002/0112033 A1*   8/2002   Doemling ........... G06F 17/2247
                                                              709/219
2005/0076051 A1    4/2005   Carobus et al.
(Continued)

FOREIGN PATENT DOCUMENTS

CN    1720547 A    1/2006
CN    1882958 A    12/2006
(Continued)

OTHER PUBLICATIONS

Jansen (Picture Password: A Visual Login Technique for Mobile Devices, NISTIR 7030, Jul. 2003, 20 pages) (Year: 2003).*
(Continued)

*Primary Examiner* — Oleg Korsak
(74) *Attorney, Agent, or Firm* — Knobbe, Martens, Olson & Bear, LLP

(57) ABSTRACT

The present disclosure provides an information display method, which can be applied to a display server. An example method includes obtaining at least two sub-pictures, original position information and first current position information of each sub-picture in a picture. The at least two reordered sub-pictures, and first current position information of the at least two reordered sub-pictures are transmitted to a social application client. Second current position information about all of or some of the at least two sub-pictures is received from the social application client. It is determined whether second current position of each sub-picture is the same as the original position, and if yes, interactive information about information displayed by the picture is transmitted to the social application client. The present disclosure also provides a corresponding display server and social
(Continued)

application client. A flexible information display mode may be provided, by adopting technical solutions in the present disclosure.

15 Claims, 6 Drawing Sheets

(51) Int. Cl.
  *G06F 3/0481* (2013.01)
  *G06Q 50/00* (2012.01)

(52) U.S. Cl.
  CPC ..... *G06Q 50/01* (2013.01); *G09G 2340/0464* (2013.01); *G09G 2370/022* (2013.01); *G09G 2370/027* (2013.01)

(56) References Cited

U.S. PATENT DOCUMENTS

2009/0258687 A1  10/2009  Weichselbaum
2015/0317673 A1  11/2015  Donovan et al.

FOREIGN PATENT DOCUMENTS

| | | |
|---|---|---|
| CN | 103078745 A | 5/2013 |
| CN | 104579658 A | 4/2015 |
| CN | 104796428 A | 7/2015 |
| CN | 105183410 A | 12/2015 |
| JP | 2012-205654 A | 10/2012 |
| KR | 10-2006-0086374 A | 7/2006 |

OTHER PUBLICATIONS

Spaans (Solving sliding-block puzzles, Dec. 15, 2009, 104 pages) (Year: 2009).*
Office Action Issued in Chinese Application No. 201510496334.7 dated Aug. 17, 2017, 17 pages.
International Search Report for International Application No. PCT/CN2016/082973 dated Aug. 30, 2016, 4 pages.
Office Action with Translation Issued for Japanese Patent Application No. 2018-513712 dated Jan. 15, 2019, in 8 pages.
International Preliminary Report on Patentability for International Application No. PCT/CN2016/082973 dated Feb. 13, 2018.
Office Action with Translation Issued for Korean Application No. 10-2017-7032469 dated Mar. 29, 2019.

* cited by examiner

INFORMATION DISPLAY METHOD, DISPLAY SERVER, SOCIAL APPLICATION CLIENT AND SYSTEM

CROSS-REFERENCE TO RELATED APPLICATIONS

This application claims priority to, and is a continuation of, International Application No. PCT/CN2016/082973, filed May 23, 2016. This application further claims priority to Chinese Patent Application No. 201510496334.7, filed Aug. 13, 2015. The entire disclosures of each of the above applications are incorporated by reference in their entirety for all purposes. Any and all applications for which a foreign or domestic priority claim is identified in the Application Data Sheet as filed with the present application are hereby incorporated by reference in their entirety under 37 CFR 1.57.

TECHNICAL FIELD

The present disclosure relates to computer technologies, and more particularly, to an information display method, a display server, a social application client and a system.

BACKGROUND

At present, a picture may be used to carry information (such as, an advertisement, promotion). Information carried by a picture may be displayed for a user of a terminal device, by displaying the picture on the terminal device. Specifically, a terminal device obtains a picture to be displayed from a server, and displays the picture for the user of the terminal device.

SUMMARY

Embodiments of the present disclosure provide an information display method, a display server, a social application client and a system, so as to provide a flexible information display mode.

An embodiment of the present disclosure provides an information display method, which is applied to a display server, including:

obtaining at least two sub-pictures, original position information and first current position information of each sub-picture in a picture, wherein the picture is configured to display the original position information and first current position information of each sub-picture in the picture, the at least two sub-pictures are obtained by dividing the picture, the first current position is obtained after reordering the at least two sub-pictures;

transmitting the reordered at least two sub-pictures, and the first current position information of the at least two sub-pictures to a social application client;

receiving second current position information about all of or some of the at least two sub-pictures from the social application client, determining whether a second current position of a sub-picture is the same as an original position of the sub-picture;

when determining that the second current position of the sub-picture is the same as the original position of the sub-picture, transmitting interactive information related with the information displayed by the picture to the social application client.

An embodiment of the present disclosure provides an information display method, which is applied to a social application client running on a terminal device, including:

receiving at least two sub-pictures, and position information of each reordered sub-picture in a picture from a picture processing server, displaying a sub-picture, based on received position information of the sub-picture in the picture;

wherein the picture is configured to display the position information of each reordered sub-picture in the picture, the at least two sub-pictures are obtained, after dividing the picture by the picture processing server, position information of each sub-picture is obtained, after a display server reorders the at least two sub-pictures;

in response to a movement operation performed by a user on all of or some of the at least two sub-pictures, displaying all of or some of the at least two sub-pictures at new positions, transmitting current position information about all of or some of the at least two moved sub-pictures to the display server;

when receiving interactive information from the display server, displaying the interactive information for the user.

An embodiment of the present disclosure provides a display server including a processor, in which the processor is configured to execute instructions stored in a memory, and the instructions are configured to:

obtain at least two sub-pictures, original position information and first current position information of each sub-picture in a picture, wherein the picture is configured to display the original position information and the first current position information of each sub-picture in the picture, the at least two sub-pictures are obtained by dividing the picture; the first current position is obtained, after reordering the at least two sub-pictures;

receive second current position information of the at least two sub-pictures from the social application client;

transmit the at least two reordered sub-pictures, and first current position information of the at least two reordered sub-pictures to the social application client;

for a sub-picture of the at least two sub-pictures, when determining that original position information of the sub-picture is the same as current position information of the sub-picture, transmit interactive information related with the information displayed by the picture to the social application client; and, determine whether second current position of the sub-picture is the same as the original position of the sub-picture.

An embodiment of the present disclosure provides a social application client including a processor, in which the processor is configured to execute instructions stored in a memory, and the instructions are configured to:

receive at least two sub-pictures, and position information of each sub-picture in a picture from a picture processing server, wherein the picture is configured to display the position information of each sub-picture in the picture, the at least two sub-pictures are obtained, after dividing the picture by the picture processing server, the position information of each sub-picture is obtained by a display server, after reordering the at least two sub-pictures;

in response to a movement operation performed by a user on all of or some of the at least two sub-pictures, transmit current position information about all of or some of the at least two sub-pictures to the display server;

receive interactive information from the display server;

for a sub-picture of the at least two sub-pictures, display the sub-picture, based on the received position information about the sub-picture in the picture;

for a sub-picture of the at least two sub-pictures, in response to a movement operation performed by the user on the sub-picture, display the sub-picture at a new position;

when receiving the interactive information, display the interactive information for the user.

An embodiment of the present disclosure provides an information display system, which includes a picture processing server, a display server and a social application client, wherein the display server is configured to obtain at least two sub-pictures, original position information and first current position information of each sub-picture in a picture, wherein the picture is configured to display the original position information and the first current position information of each sub-picture in the picture, the at least two sub-pictures are obtained by dividing the picture, the first current position is obtained, after reordering the at least two sub-pictures; transmit the at least two reordered sub-pictures and first current position information of the at least two reordered sub-pictures to the social application client; receive second current position information about all of or some of the at least two sub-pictures from the social application client; for a sub-picture of the at least two sub-pictures, determine whether second current position of the sub-picture is the same as the original position of the sub-picture; when determining that the second current position of the sub-picture is the same as the original position of the sub-picture, transmit interactive information related with the information displayed by the picture to the social application client;

the social application client, which runs on the terminal device, is configured to receive from a picture processing server the at least two sub-pictures, and position information of each reordered sub-picture in the picture, for a sub-picture of the at least two sub-pictures, display the sub-picture, based on received position information of the sub-picture in the picture; wherein the picture is configured to display the position information of each reordered sub-picture in the picture, the at least two sub-pictures are obtained by the picture processing server, after dividing the picture; the position information of each sub-picture is obtained by the display server, after reordering the at least two sub-pictures; in response to a movement operation performed by a user on all of or some of the at least two sub-pictures, display all of or some of the at least two sub-pictures at new positions, transmit current position information about all of or some of the at least two moved sub-pictures to the display server.

BRIEF DESCRIPTIONS OF THE DRAWINGS

To describe technical solutions in the embodiments of the present disclosure or in the prior art more clearly, brief descriptions about attached figures used in depicting embodiments or prior art will be provided in the following. It should be understood that the attached figures and following descriptions are only some embodiments of the present disclosure. For persons having ordinary skill in the art, other figures and description may also be obtained based on these attached figures and below description and fall within the scope of the present disclosure.

DETAILED DESCRIPTION

Clear and complete descriptions for technical solutions in the embodiments of the present disclosure will be provided in the following, accompanying with attached figures in the embodiments of the present disclosure. It should be understood that the embodiments described herein are only some embodiments of the present disclosure. On the basis of embodiments in the present disclosure, other embodiments may be obtained by persons having ordinary skill in the art and fall within the scope of the present disclosure.

During research processes, an inventor of the present disclosure finds that, a terminal device is configured to simply display a picture for a user, in which the picture displays information (such as, advertisement information, promotion information). The display mode thereof is not flexible, and related interactive information (e.g., grab red paper containing money as a gift, grab discount information) cannot be provided.

In view of above, an embodiment provides an information display method. On the basis of the method provided by an embodiment of the present disclosure, a flexible information display mode is provided. Meanwhile, interactive information related with such displayed information is also provided.

Figure 1:
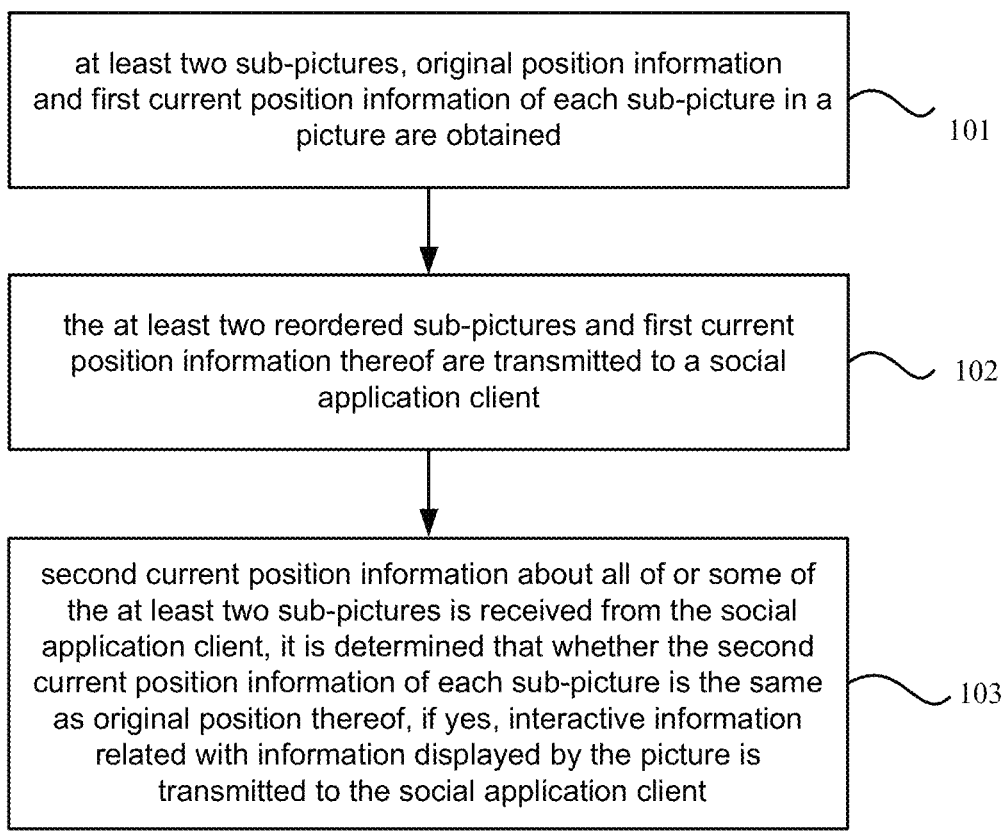
FIG. 1 is a flowchart illustrating an information display method, in accordance with an embodiment of the present disclosure.

FIG. 1 is a flowchart illustrating an information display method, in accordance with an embodiment of the present disclosure. The method is applied to a server. As shown in FIG. 1, the method includes the following blocks.

In block 101, at least two sub-pictures, original position information and first current position information of each sub-picture in a picture are obtained.

The picture is configured to display foregoing information, that is, the original position information and the first current position information of each sub-picture in the picture. The at least two sub-pictures are obtained by dividing the picture. The first current position is obtained, after reordering the at least two sub-pictures.

In an embodiment of the present disclosure, at least two sub-pictures and original position information of each sub-picture in the picture are received from a picture processing server, and are recorded.

In an embodiment of the present disclosure, an information promotion party (e.g., an advertisement promotion party) may upload a picture to the picture processing server via a computing device (e.g., a server providing an advertisement picture). The picture is configured to display the information. The picture processing server obtains the at least two sub-pictures by dividing the picture.

In an embodiment of the present disclosure, an original position pointed to by original position information of a sub-picture at least includes a position of the sub-picture in the picture. When a similarity between the sub-picture and at least one other sub-picture is greater than a set threshold, the original position pointed to by original position information of the sub-picture further includes the position of the at least one other sub-picture in the picture.

In block 102, the at least two reordered sub-pictures and the first current position thereof are transmitted to a social application client.

In an embodiment of the present disclosure, the at least two sub-pictures are reordered. The first current position information of each reordered sub-picture is recorded. The at least two reordered sub-pictures, and the first current position information of the at least two reordered sub-pictures are transmitted to the social application client, such that the social application client displays the at least two sub-pictures based on the first current position information.

In block 103, second current position information about all of or some of the at least two sub-pictures are received from the social application client, and it is determined that whether the second current position is the same as the original position of each sub-picture. If they are the same, the interactive information related with information displayed by the picture is transmitted to the social application client.

In an embodiment of the present disclosure, the second position information of a sub-picture is received from the social application client, and current position information of the sub-picture is updated. On the basis of the recorded original position information and current position information of each sub-picture, it is determined that whether the current positions of the at least two sub-pictures are respectively the same as the original positions thereof. When they are the same, the interactive information related with information displayed by the picture is transmitted to the social application client.

Subsequently, the social application client displays the interactive information for the user.

In an embodiment of the present disclosure, if an original position of a sub-picture includes two or more positions, when current position of the sub-picture is the same as any position among the original positions thereof, it is determined that the current position of the sub-picture is the same as the original position of the sub-picture. If an original position of a sub-picture includes one position, when current position of the sub-picture is the same as the original position of the sub-picture, it is determined that the current position of the sub-picture is the same as the original position thereof.

Figure 2:
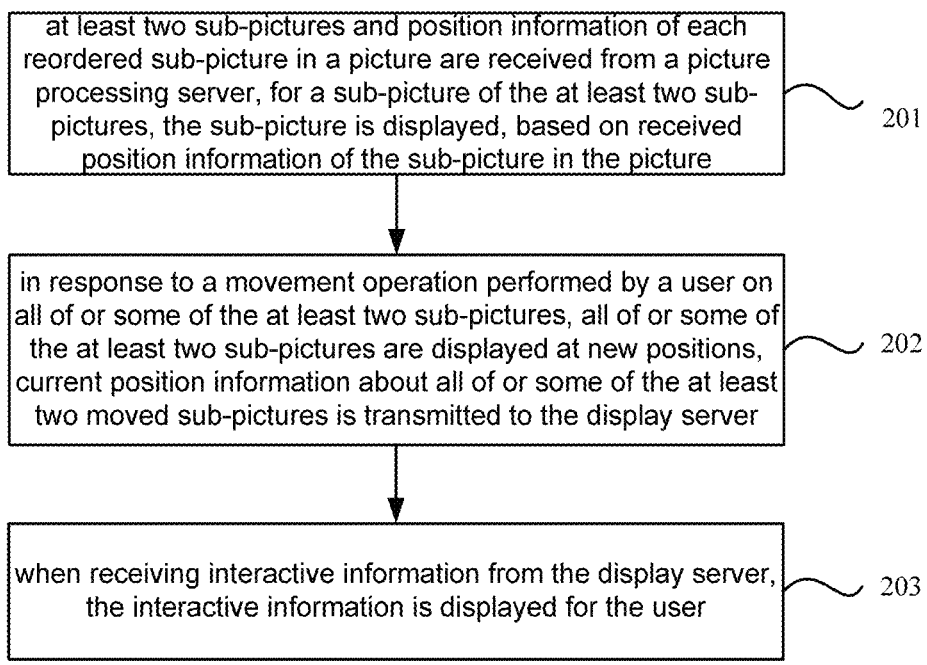
FIG. 2 is a flowchart illustrating an information display method, in accordance with an embodiment of the present disclosure.

FIG. 2 is a flowchart illustrating an information display method, in accordance with an embodiment of the present disclosure. The method is applied to a social application client running on a terminal device. As shown in FIG. 2, the method includes the following blocks.

In block 201, at least two sub-pictures, and position information of each reordered sub-picture in a picture are received from a picture processing server; for a sub-picture of the at least two sub-pictures, the sub-picture is displayed, based on received position information of the sub-picture in the picture.

The picture is configured to display foregoing information, that is, the position information of each reordered sub-picture in the picture. The at least two sub-pictures are obtained, after dividing the picture by the picture processing server. The position information of each sub-picture is obtained by the display server, after reordering the at least two sub-pictures.

In block 202, in response to a movement operation about all of or some of the at least two sub-pictures performed by a user, all of or some of the at least two sub-pictures are displayed at new positions, current position information about all of or some of the moved at least two sub-pictures is transmitted to the display server.

In block 203, when receiving interactive information from the display server, the interactive information is displayed for the user.

In an embodiment of the present disclosure, the interactive information is displayed for the user on a pre-specified sub-picture.

In an embodiment of the present disclosure, when the interactive information includes a Uniform Resource Locator (URL), in response to the user's click on the URL, a web page corresponding to the URL is opened.

Figure 3:
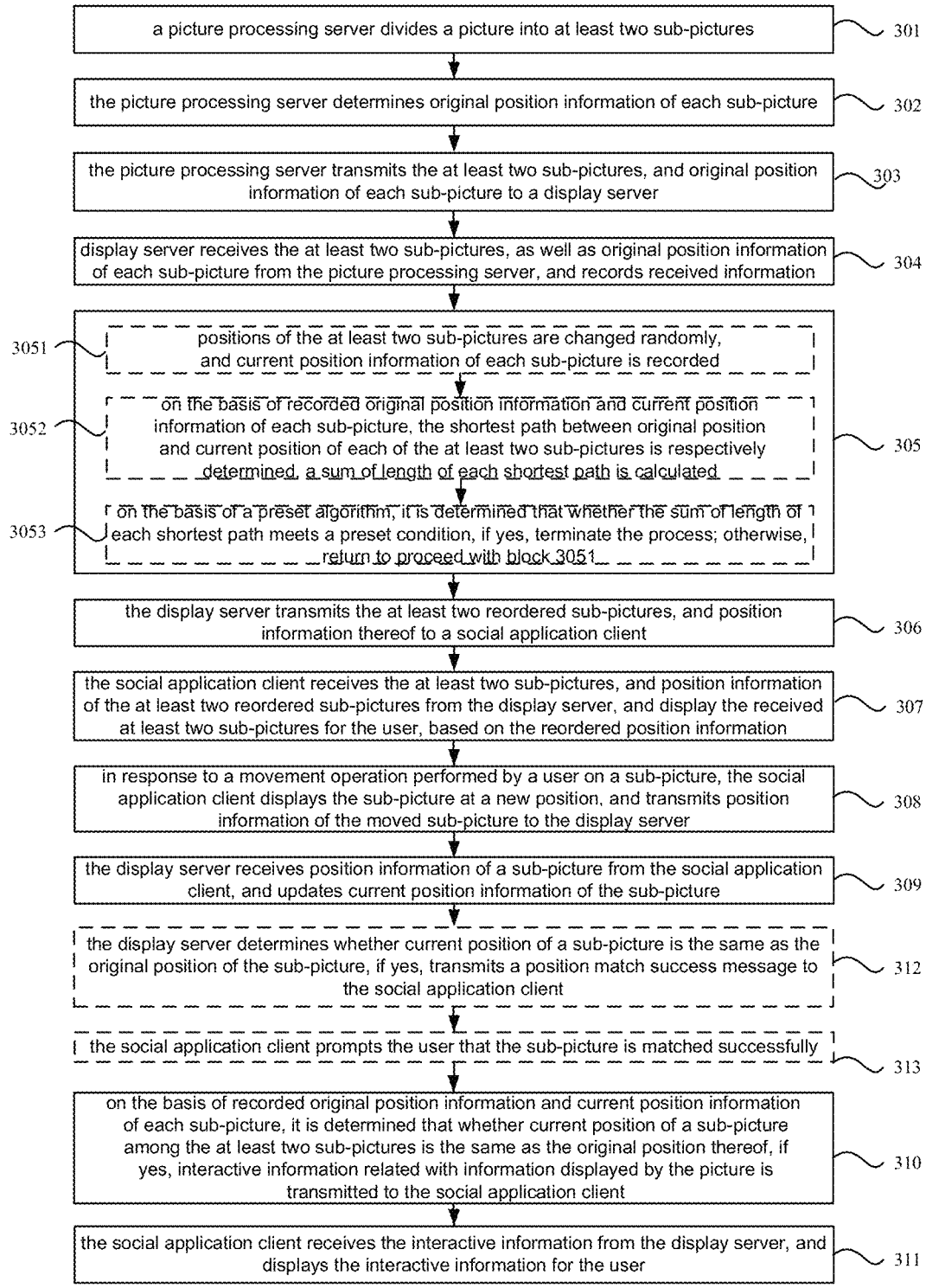
FIG. 3 is a flowchart illustrating an information display method, in accordance with an embodiment of the present disclosure.

FIG. 3 is a flowchart illustrating an information display method, in accordance with an embodiment of the present disclosure. As shown in FIG. 3, the method includes the following blocks.

In block 301, a picture processing server divides a picture into at least two sub-pictures.

In an embodiment of the present disclosure, the picture is configured to display information (e.g., advertisement information, promotion information, and so on).

Figure 4A:
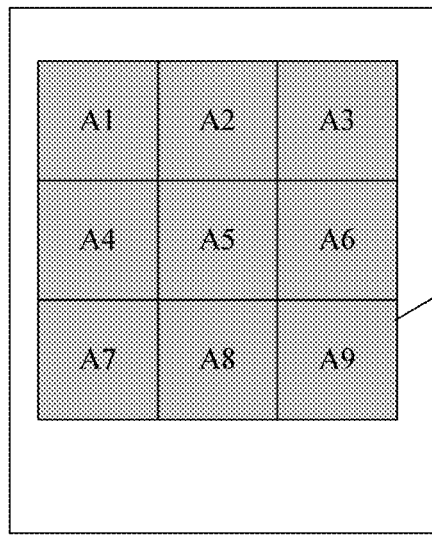
FIG. 4A is a schematic diagram illustrating a sub-picture obtained after dividing a picture, in accordance with an embodiment of the present disclosure.
Figure 4B:
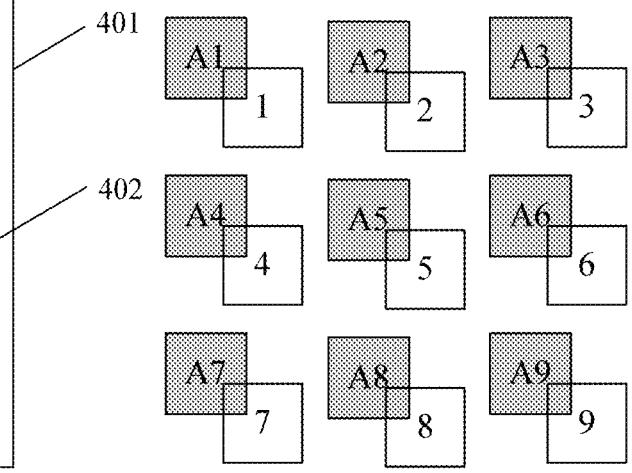
FIG. 4B is a schematic diagram illustrating a sub-picture obtained after dividing a picture, in accordance with an embodiment of the present disclosure.

In an embodiment of the present disclosure, an area may be selected from the picture. Such area meets the following condition. Two square sub-pictures of the same size may be obtained, after dividing the picture, e.g., 6 or 9 squares. As shown in FIG. 4A, an area 402 is selected from a picture 401. The selected area 402 is divided into 9 square sub-pictures. A corresponding position of each sub-picture is respectively denoted with position A1-position A9. As shown in FIG. 4B, sub-pictures corresponding to position A1-position A9 are respectively denoted with sub-pictures 1-9. Specifically, an area may be selected from the picture, so as to determine whether it is possible to divide the area into at least two square sub-pictures of the same size. If yes, the area is divided into at least two sub-pictures; otherwise, the block of selecting an area from the picture and subsequent blocks are re-executed.

In an embodiment of the present disclosure, an area may be selected from the picture. The area meets the following condition. At least two square sub-pictures of the same size may be obtained from the area. Meanwhile, color difference of a sub-picture located in the lower right corner of the picture is less than a set threshold. As shown in FIG. 4A, an area 402 is selected from the picture 401. The selected area 402 is divided into 9 square sub-pictures. A corresponding position of each sub-picture is respectively denoted with position A1-position A9. As shown in FIG. 4B, sub-pictures corresponding to positions A1-A9 are respectively denoted with sub-pictures 1-9. Color difference of sub-picture 9 is less than a set threshold. Specifically, an area may be selected from the picture. And it is determined that whether the area can be divided into preset at least two squares of the same size. When determining that the area can be divided into preset at least two squares of the same size, it is further determined that whether color difference of a sub-picture in the lower right corner of the picture is less than a preset threshold. When determining that color difference of the sub-picture in the lower right corner of the picture is less than the preset threshold, at least two sub-pictures are obtained by dividing such area; otherwise, the block of selecting an area from the picture and subsequent blocks are re-executed.

In block 302, the picture processing server determines original position information of each sub-picture.

In an embodiment of the present disclosure, the original position information of a sub-picture at least includes position information of the sub-picture in the picture. When a similarity between the sub-picture and at least one other sub-picture is greater than a set threshold, the original position information of the sub-picture further includes position information of the at least one other sub-picture in the picture. As shown in FIG. 4A, if similarity between sub-picture 4 and sub-picture 6 is greater than a set threshold, the original position indicated by the original position information of sub-picture 4 includes positions A4 and A6. The original position indicated by the original position information of sub-picture 6 includes positions A4 and A6.

In block 303, the picture processing server transmits at least two sub-pictures and original position information of each sub-picture to a display server.

In block 304, the display server receives the at least two sub-pictures and the original position information of each sub-picture from the picture processing server, and then records the received information.

In block 305, the display server reorders the at least two sub-pictures, and records current position information of the reordered sub-pictures.

Figure 4C:
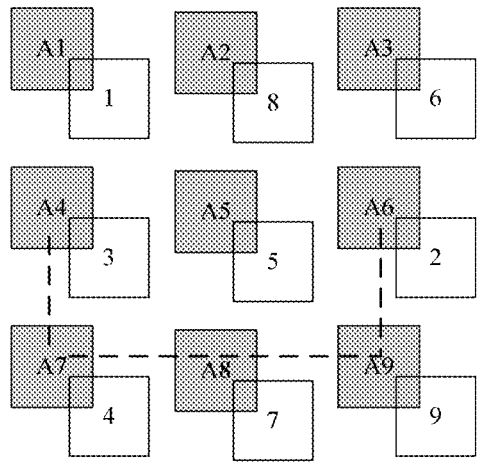
FIG. 4C is a schematic diagram illustrating the shortest path between a current position of a sub-picture and an original position of the sub-picture, in accordance with an embodiment of the present disclosure.

In an embodiment of the present disclosure, except for a preset sub-picture with unchanged position among the at least two sub-pictures, the remaining sub-pictures may be reordered. For example, as shown in FIG. 4C, assume that position of sub-picture 9 is unchanged, only sub-pictures 1-8 are reordered when reordering is performed. The position of sub-picture 9 is still unchanged.

In an embodiment of the present disclosure, block 305 may include the following blocks.

In block 3051, positions of the at least two sub-pictures are changed randomly, and current position information of each sub-picture is recorded.

In block 3052, on the basis of recorded original position information and current position information of each sub-picture, the shortest path between original position and current position of each of the at least two sub-pictures is respectively determined, and a sum of length of each shortest path is calculated.

In an embodiment of the present disclosure, during the process of determining the shortest path between original position and current position of each of the at least two sub-pictures, when an original position of a sub-picture includes at least two positions, the shortest path between current position of the sub-picture and each original position thereof is respectively determined. A path with the shortest length is taken as the shortest path between original position and current position of the sub-picture. As shown in FIG. 4C, when similarity between sub-picture 4 and sub-picture 6 is greater than a set threshold, the position indicated by original position information of sub-picture 4 includes positions A4 and A6. Current position of sub-picture 4 is A7. The shortest path between current position A7 of sub-picture 4 and position A4 indicated by original position information thereof is A7 A4, length of which is 1. The shortest path between current position A7 of sub-picture 4 and position A6 indicated by original position information thereof is A7 A8 A9 A6, length of which is 3. Subsequently, in foregoing two shortest paths, length of the shortest path between current position of sub-picture 4 and position A4 indicated by original position information thereof is the shortest. Thus, it is determined that the shortest path between current position and original position of sub-picture 4 is the shortest path from A7 to A4.

When current position and original position of a sub-picture is the same, that is, position of the sub-picture within the picture is not changed. Length of the shortest path between original position and current position of the sub-picture is 0.

In an embodiment of the present disclosure, the Dijkstra algorithm, A-Star (which is also referred to as A*) algorithm may be adopted to determine the shortest path, which is between original position and current position of any sub-picture. No repeated content is provided here.

In block 3053, on the basis of a preset algorithm, it is determined that whether a sum of length of each shortest path meets a preset condition; if the preset condition is met, terminate the process; otherwise, return to proceed with block 3051.

In an embodiment of the present disclosure, the preset algorithm may include any one of the following.

When the sum of length of each shortest path is less than a preset first threshold, and is greater than a preset second threshold, it is determined that the sum of length of each shortest path meets the preset condition. The first threshold is greater than the second threshold. That is, the sum of length of each shortest path is between the first threshold and the second threshold. Thus, it may be guaranteed that difficulty of an algorithm meeting the preset condition is moderate, thereby avoiding that a user of a social application client cannot move back each reordered sub-picture to the original position thereof, due to the fact that the sum of length of each shortest path is too big or even infinite.

When the sum of length of each shortest path is less than the preset first threshold, it is determined that the sum of length of each shortest path meets the preset condition, thereby avoiding that a user of a social application client cannot move back each reordered sub-picture to the original position thereof, due to the fact that the sum of length of each shortest path is too big or even infinite.

In block 306, the display server transmits the at least two reordered sub-pictures, and reordered position information thereof to the social application client.

In an embodiment of the present disclosure, the social application client may be an application running on a terminal device. The terminal device may be a computing device with functions of data calculation processing and storing. The terminal device includes, but is not limited to, a smart phone (installed with a communication module), a handheld computer, a tablet computer, a smart TV, and so on. These communication terminals are installed with an Operating System (OS), which includes, but is not limited to, Android OS, Symbian OS, Windows mobile OS, iPhone OS, and so on.

In block 307, the social application client receives the at least two sub-pictures, and reordered position information thereof from the picture processing server, and displays the received at least two sub-pictures for a user, based on the reordered position information thereof.

In an embodiment of the present disclosure, during the reordering process, when position of a preset sub-picture is not changed (for example, position of a sub-picture 9 in FIG. 4B is not changed, in which color difference of sub-picture 9 is less than a set threshold), the display server may indicate the social application client to display the remaining sub-pictures of the at least two sub-pictures, except for sub-picture 9, when receiving the at least two sub-pictures and reordered position information thereof.

Figure 4D:
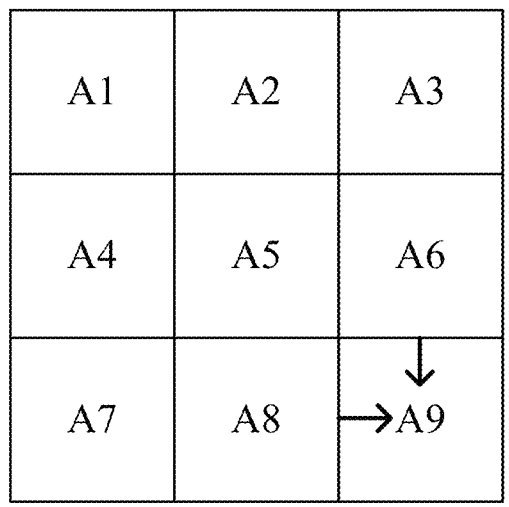
FIG. 4D is a schematic diagram illustrating picture-movement description information, in accordance with an embodiment of the present disclosure.

In an embodiment of the present disclosure, movement description information of a sub-picture may be displayed for a user on a preset sub-picture. Such description information indicates the direction and path to move the sub-picture by the user, and so on. For example, as shown in FIG. 4D, the description information displayed on sub-picture 9 is two arrows respectively pointing to down and right, which indicates that the user can move the sub-picture at position A6 downwards, and move the sub-picture at position A8 towards right.

In block 308, in response to a moving operation for a sub-picture performed by a user, the social application client displays the sub-picture at a new position, and transmits position information of the moved sub-picture to the display server.

In block 309, the display server receives position information of a sub-picture from the social application client, and updates current position information of the sub-picture.

In block 310, on the basis of recorded original position information and current position information of each sub-picture, it is determined that whether current position of each of the at least two sub-pictures is the same as the original position thereof, if yes, interactive information related with information displayed by the picture is transmitted to the social application client.

In an embodiment of the present disclosure, if an original position of a sub-picture includes two or more positions, when current position of the sub-picture is the same as any position among the original position thereof, it is determined that the current position of the sub-picture is the same as the original position thereof. If an original position of a sub-picture includes one position, when the current position of the sub-picture is the same as the original position thereof, it is determined that the current position of the sub-picture is the same as the original position thereof.

In block 311, the social application client receives the interactive information from the display server, and displays the interactive information for the user.

In an embodiment of the present disclosure, the interactive information may be displayed on a pre-specified sub-picture.

In an embodiment of the present disclosure, when a preset sub-picture is not moved during the reordering process, the display server may indicate to display the sub-picture when receiving the interactive information, and display the interactive information on the sub-picture.

In an embodiment of the present disclosure, the interactive information may include a URL. In response to a user's click on the URL, a webpage corresponding to the URL is opened. For example, when the URL corresponds to a webpage of "grabbing red paper containing money as a gift", in response to the user's click on the URL, the webpage corresponding to the URL is opened, thus, the user may grab red paper containing money as a gift on such webpage. In another embodiment of the present disclosure, the interactive information may include an address link for downloading resources. In response to a user's click on such link, a corresponding resource is downloaded from the address link.

In an embodiment of the present disclosure, blocks 301 to 302 may be executed by the picture processing server, or by the display server, which is not limited by the present disclosure.

In an embodiment of the present disclosure, after block 309, the method may further include the following blocks.

In block 312, the display server determines whether current position of the sub-picture is the same as the original position of the sub-picture. If they are the same, the display server transmits a position match success message to the social application client.

In block 313, the social application client prompts the user that the sub-picture is matched successfully.

In an embodiment of the present disclosure, if the sub-picture is matched successfully, the frame of the sub-picture may be denoted with a dashed box of a preset color.

The foregoing contents describe the information display method, which is put forward by embodiments of the present disclosure. Descriptions about the display server in the embodiments of the present disclosure will be provided in the following, accompanying with attached figures.

Figure 5:
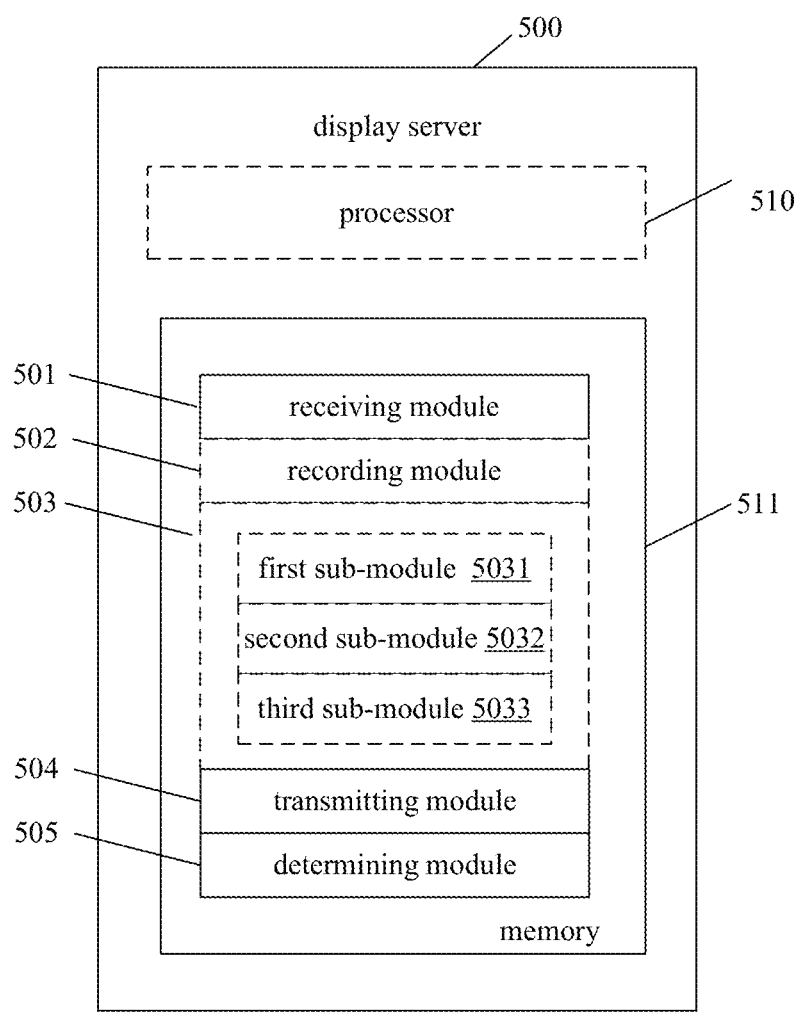
FIG. 5 is a schematic diagram illustrating a structure of a display server, in accordance with an embodiment of the present disclosure.

FIG. 5 is a schematic diagram illustrating a structure of a display server, in accordance with an embodiment of the present disclosure. As shown in FIG. 5, the display server 500 includes a receiving module 501, a transmitting module 504 and a determining module 505.

The receiving module 501 is configured to obtain at least two sub-pictures, original position information and first current position information of each sub-picture in a picture. The picture is configured to display foregoing information, that is, the original position information and first current position information of each sub-picture in the picture. The at least two sub-pictures are obtained by dividing the picture. The first current position information is obtained, after reordering the at least two sub-pictures. Second current position information of the at least two sub-pictures is received from a social application client.

The transmitting module 504 is configured to transmit the reordered at least two sub-pictures, and first current position information of the reordered at least two sub-pictures to the social application client. When determining that the original position information of each sub-picture is the same as the second current position information thereof, the transmitting module 504 is further configured to transmit interactive information related with information displayed by the picture to the social application client.

The determining module 505 is configured to determine, whether the second current position information of each of the at least two sub-pictures is the same as the original position thereof.

In an embodiment of the present disclosure, the display server 500 further includes a reordering module 503.

The reordering module 503 is configured to reorder the at least two sub-pictures.

In an embodiment of the present disclosure, the reordering module 503 is further configured to reorder the remaining sub-pictures of the at least two sub-pictures, except for one sub-picture with unchanged position.

In an embodiment of the present disclosure, the reordering module 503 further includes a first sub-module 5031, a second sub-module 5032 and a third sub-module 5033.

The first sub-module 5031 is configured to randomly change positions of the at least two sub-pictures, and obtain first current position information of each sub-picture.

On the basis of recorded original position information and first current position information of each sub-picture, the second sub-module 5032 is configured to respectively determine, the shortest path between original position of each of the at least two sub-pictures and first current position thereof, and calculate a sum of length of each shortest path.

On the basis of a preset algorithm, the third sub-module 5033 is configured to determine, whether the sum of length of each shortest path meets a preset condition. When the preset condition is not met, operations of the first sub-module and subsequent operations are executed once again.

In an embodiment of the present disclosure, the original position indicated by original position information of a sub-picture at least includes the position of the sub-picture in the picture. When a similarity between the sub-picture and at least one other sub-picture is greater than a set threshold, the original position indicated by the original position information of the sub-picture further includes a position of the at least one other sub-picture in the picture.

When an original position of a sub-picture includes two or more positions, the determining module 505 is further configured to determine that the second current position of the sub-picture is the same as the original position thereof, when the second current position of the sub-picture is the same as any position among the original positions thereof. When an original position of a sub-picture includes one position, the determining module 505 is further configured to determine that the second current position of the sub-picture is the same as the original position thereof, when the second current position of the sub-picture is the same as the original position thereof.

In an embodiment of the present disclosure, an original position indicated by original position information of a sub-picture at least includes the position of the sub-picture in the picture. When a similarity between the sub-picture and at least one other sub-picture is greater than a set threshold, the original position indicated by the original position information of the sub-picture further includes the position of the at least one other sub-picture in the picture.

During the process of determining the shortest path, which is between the original position and current position of each of the at least two sub-pictures, when an original position of a sub-picture includes two or more positions, the reordering module 503 is further configured to respectively determine the shortest path, which is between current position of the sub-picture and each position among the first original position of the sub-picture, select the shortest path of the minimum length, and take the selected shortest path as the shortest path between the original position and current position of the sub-picture.

When an original position of a sub-picture includes two or more positions, the determining module 505 is further configured to determine that a second current position of the sub-picture is the same as the original position thereof, if the second current position of the sub-picture is the same as any position among the original positions thereof. When an original position of a sub-picture includes one position, the determining module 505 is further configured to determine that the second current position of the sub-picture is the same as the original position thereof, if the second current position of the sub-picture is the same as the original position thereof.

In an embodiment of the present disclosure, on the basis of original position information of a sub-picture, the determining module 505 is further configured to determine whether a second current position of the sub-picture is the same as original position thereof, if they are the same, the determining module 505 is further configured to transmit a position match success message to a social application client, such that the social application client prompts the user that the sub-picture is matched successfully.

In an embodiment of the present disclosure, the display server 500 further includes a recording module 502.

When obtaining original position information and first current position information of each sub-picture in the picture, the recording module 502 is configured to record the original position information and the first current position information of each sub-picture. When receiving second current position information of a sub-picture among the at least two sub-pictures, the recording module 502 is further configured to update the recorded current position information of the sub-picture to be the second current position information thereof.

On the basis of currently recorded original position information and current position information of each sub-picture, the determining module 505 is further configured to determine, whether current positions of the at least two sub-pictures are respectively the same as original positions thereof.

Foregoing modules 501 to 505 may be instruction modules stored in a memory 510 of the display server 500. These instruction modules include instructions, which are executable by a processor. When a processor 511 in the display server 500 executes instructions of modules 501 to 505, each function of foregoing modules 501 to 505 may be implemented.

Figure 6:
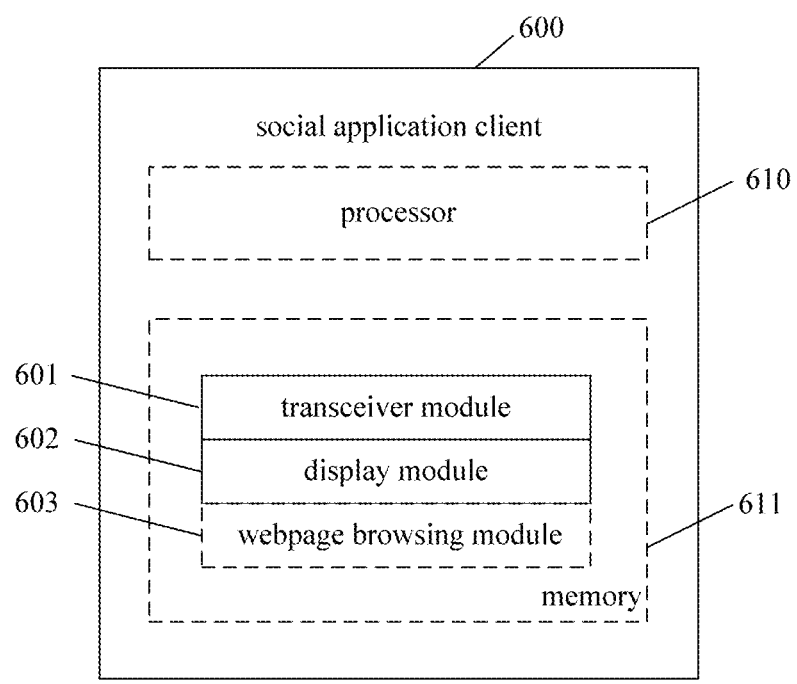
FIG. 6 is a schematic diagram illustrating a structure of a social application client, in accordance with an embodiment of the present disclosure.

FIG. 6 is a schematic diagram illustrating a structure of a social application client, in accordance with an embodiment of the present disclosure. As shown in FIG. 6, a client 600 includes a transceiver module 601 and a display module 602.

The transceiver module 601 is configured to receive at least two sub-pictures, and reordered position information of each sub-picture in a picture, from a picture processing server. The picture is configured to display foregoing information, that is, the reordered position information of each sub-picture in the picture. The at least two sub-pictures are obtained by the picture processing server, after dividing the picture. The transceiver module 601 is further configured to transmit position information, which is about all of or some of the at least two sub-pictures moved by a user, to the display server, and receive interactive information from the display server.

In response to a moving operation to any sub-picture performed by a user, the display module 602 is configured to display the sub-picture at a new position, and display the interactive information received by the transceiver module for the user.

In an embodiment of the present disclosure, the transceiver module 601 is further configured to receive a position match success message from the display server, when the display server determines that current position of a sub-picture is the same as the original position thereof. The position match success message prompts the user that the sub-picture has been matched successfully.

The display module 602 is further configured to display the position match success message for the user.

In an embodiment of the present disclosure, the display module 602 is further configured to display the interactive information on a pre-specified sub-picture for the user.

In an embodiment of the present disclosure, the interactive information includes a URL. The client further includes a webpage browsing module 603. The webpage browsing module 603 is configured to open a webpage corresponding to a URL, in response to a user's click on the URL.

Foregoing modules 601 to 603 may be instruction modules, which are stored in a memory 610 of the client 600. These instruction modules include instructions, which are executable by a processor. When a processor 611 in the client 600 executes instructions of modules 601 to 603, each function of foregoing modules 601-603 may be implemented.

Figure 7:
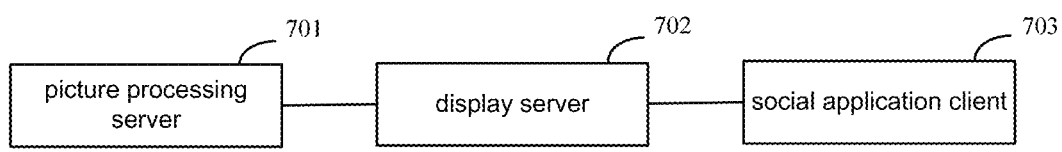
FIG. 7 is a schematic diagram illustrating a structure of an information display system, in accordance with an embodiment of the present disclosure.

FIG. 7 is a schematic diagram illustrating a structure of an information display system, in accordance with an embodiment of the present disclosure. As shown in FIG. 7, a system may include a picture processing server 701, a display server 702 and a social application client 703.

The display server 702 is configured to obtain at least two sub-pictures, original position information and first current position information of each sub-picture in a picture. The picture is configured to display foregoing information, that is, the original position information and first current position information of each sub-picture in the picture. The at least two sub-pictures are obtained by dividing the picture. The first current position is obtained, after reordering the at least two sub-pictures. The display server 702 is further configured to transmit the at least two reordered sub-pictures, and the first current position information thereof to the social application client; receive second current position information about all of or some of the at least two sub-pictures from the social application client, determine whether the second current position of a sub-picture is the same as the original position thereof; if yes, transmit interactive information related with information displayed by the picture to the social application client.

In an embodiment of the present disclosure, an information promotion party (e.g., an advertisement promotion party) may upload a picture to the picture processing server, through a computing device (e.g., a server providing an advertisement picture).

The social application client 703 is configured to receive at least two sub-pictures, and position information of each reordered sub-picture in the picture, from the picture processing server, and display each sub-picture in the picture, based on the received position information of each sub-picture in the picture. The picture is configured to display foregoing information, that is, the position information of each reordered sub-picture in the picture. The at least two sub-pictures are obtained by the picture processing server, after dividing the picture. The position information of each sub-picture is obtained by the display server, after reordering the at least two sub-pictures. In response to a moving operation, which is performed by a user to all of or some of the at least two sub-pictures, the social application client 703 is further configured to display all of or some of the at least two sub-pictures at new positions, and transmit current position information about all of or some of the at least two moved sub-pictures to the display server.

The display server, the social application client, the information display system, which are provided by foregoing embodiments, and foregoing embodiments about information display method may belong to the same conception. The specific implementation process may refer to foregoing method embodiments, which are not repeated here.

In addition, each functional module in the embodiments of the present disclosure may be integrated into one processing unit. Alternatively, each functional module may exist independently. Still alternatively, two or more functional modules may be integrated into one unit. Foregoing integrated unit may be implemented with hardware, or with software functional units. The functional module in foregoing each embodiment may be located within a terminal, or a network node, or may be distributed among multiple terminals, or multiple network nodes.

In addition, each embodiment in the present disclosure may be implemented by a data processing program, which is executed by a data processing device, e.g., a computer. It is obvious that the data processing program constitutes the present disclosure. In addition, a data processing program stored in a storage medium is generally executed, by directly reading the program from the storage medium, or installing/copying the program to a storage device (e.g., hardware, and/or, memory) of a data processing device. Thus, such storage medium also constitutes the present disclosure. The storage medium may adopt a recording mode of any type, such as, a paper storage medium (e.g., a paper tape), a magnetic storage medium (e.g., a floppy disk, a hard disk, a flash memory), an optical storage medium (e.g., a Compact Disk (CD)-Read-only memory (ROM)), a Magneto-Optical Storage Medium (e.g., MO).

Thus, the present disclosure also provides a storage medium, which stores a data processing program. The data processing program is configured to execute any foregoing method embodiment in the present disclosure.

Persons having ordinary skill in the art may understand that, all the blocks or some blocks in foregoing method embodiments may be implemented with hardware, or may be implemented with hardware instructed by a program. The program may be stored in a computer readable storage medium. The above-mentioned storage medium may be a ROM, a disk, or a CD, and so on.

The foregoing is only preferred embodiments of the present disclosure, which is not for use in limiting the present disclosure. Any modifications, equivalent substitutions, or improvements made within the spirit or principle of the present disclosure should be covered by the present disclosure.

What is claimed is:

1. An information display method, which is applied to a display server, comprising:
    obtaining at least two sub-pictures, original position information and first current position information of each sub-picture in a picture, wherein the picture is configured to display the original position information and first current position information of each sub-picture in the picture, the at least two sub-pictures are obtained by dividing the picture, the first current position is obtained after reordering the at least two sub-pictures;
    transmitting the reordered at least two sub-pictures, and the first current position information of the at least two sub-pictures to a social application client;
    receiving second current position information about all of or some of the at least two sub-pictures from the social application client, determining whether a second current position of a sub-picture is the same as an original position of the sub-picture;
    when determining that the second current position of the sub-picture is the same as the original position of the sub-picture, transmitting interactive information related with the information displayed by the picture to the social application client;
    wherein the original position indicated by the original position information of the sub-picture at least comprises the position of the sub-picture in the picture, when a similarity between the sub-picture and at least one other sub-picture is greater than a set threshold, the original position indicated by the original position information of the sub-picture further comprises the position of the at least one other sub-picture in the picture;
wherein determining whether the second current position of the sub-picture is the same as the original position of the sub-picture comprises:
under the circumstances that the original position of the sub-picture comprises two or more positions, when the second current position of the sub-picture is the same as any position among the original positions of the sub-picture, determining that the second current position of the sub-picture is the same as the original position of the sub-picture;
under the circumstances that the original position of the sub-picture comprises one position, when the second current position of the sub-picture is the same as the original position of the sub-picture, determining that the second current position of the sub-picture is the same as the original position of the sub-picture.

2. The method according to claim 1, wherein reordering the at least two sub-pictures comprises:
reordering the remaining sub-pictures of the at least two sub-pictures, except for one sub-picture with an unchanged position.

3. The method according to claim 1, wherein reordering the at least two sub-pictures comprises:
A. randomly changing positions of the at least two sub-pictures, obtaining first current position information of each sub-picture;
B. on the basis of the original position information and first current position information of each sub-picture, respectively determining the shortest path between an original position of a sub-picture and a first current position of the sub-picture, and calculating a sum of length of each shortest path;
C. on the basis of a preset algorithm, determining whether the sum of length of each shortest path is less than a preset first threshold, and is greater than a preset second threshold; when determining that the sum of length of each shortest path is less than the preset first threshold, and is greater than the preset second threshold, terminating the process; otherwise, proceeding with A.

4. The method according to claim 3, wherein the original position indicated by the original position information of the sub-picture at least comprises the position of the sub-picture in the picture, when a similarity between the sub-picture and at least one other sub-picture is greater than a set threshold, the original position indicated by the original position information of the sub-picture further comprises the position of the at least one other sub-picture in the picture;
during the process of determining the shortest path between the original position and first current position of each sub-picture,
when an original position of a sub-picture comprises two or more positions, respectively determining the shortest path between first current position and each position among the original positions of the sub-picture, taking a shortest path of the minimum length as the shortest path, which is between the original position and the first current position of the sub-picture;
wherein determining whether the second current position of the sub-picture is the same as the original position of the sub-picture comprises:
under the circumstances that the original position of the sub-picture comprises two or more positions, when the second current position of the sub-picture is the same as any position among the original positions of the sub-picture, determining that the second current position of the sub-picture is the same as the original position of the sub-picture;
under the circumstances that the original position of the sub-picture comprises one position, when the second current position of the sub-picture is the same as the original position of the sub-picture, determining that the second current position of the sub-picture is the same as the original position of the sub-picture.

5. The method according to claim 1, further comprising:
when determining that the second current position of the sub-picture is the same as the original position of the sub-picture, transmitting a position match success message to the social application client, such that the social application client prompts a user that the sub-picture is matched successfully.

6. The method according to claim 1, further comprising:
when obtaining the original position information and the first current position information of each sub-picture in the picture, for a sub-picture, recording the original position information and the first current position information of the sub-picture;
wherein when receiving second current position information of a sub-picture among the at least two sub-pictures, the method further comprises:
updating the recorded current position information of the sub-picture to be the second current position information;
wherein determining whether the second current position of the sub-picture is the same as the original position of the sub-picture comprises:
on the basis of currently recorded original position information and current position information of each sub-picture, determining whether the current position of the sub-picture is the same as the original position of the sub-picture.

7. An information display method, which is applied to a social application client running on a terminal device, comprising:
receiving at least two sub-pictures, and position information of each reordered sub-picture in a picture from a picture processing server,
displaying a sub-picture, based on received position information of the sub-picture in the picture;
wherein the picture is configured to display the position information of each reordered sub-picture in the picture, the at least two sub-pictures are obtained, after dividing the picture by the picture processing server, position information of each sub-picture is obtained, after a display server reorders the at least two sub-pictures;
in response to a movement operation performed by a user on all of or some of the at least two sub-pictures, displaying all of or some of the at least two sub-pictures at new positions, transmitting current position information about all of or some of the at least two moved sub-pictures to the display server;
when receiving interactive information from the display server, displaying the interactive information for the user, wherein the display server transmits the interactive information after determining that a second current position of the sub-picture is the same as an original position of the sub-picture;
wherein the original position indicated by original position information of the sub-picture at least comprises a position of the sub-picture in the picture, when a similarity between the sub-picture and at least one other sub-picture is greater than a set threshold, the original position indicated by the original position information of the sub-picture further comprises the position of the at least one other sub-picture in the picture;

wherein determining by the display server whether the second current position of the sub-picture is the same as the original position of the sub-picture comprises:

under the circumstances that the original position of the sub-picture comprises two or more positions, when the second current position of the sub-picture is the same as any position among the original positions of the sub-picture, determining that the second current position of the sub-picture is the same as the original position of the sub-picture;

under the circumstances that the original position of the sub-picture comprises one position, when the second current position of the sub-picture is the same as the original position of the sub-picture, determining that the second current position of the sub-picture is the same as the original position of the sub-picture.

8. The method according to claim 7, further comprising: receiving a position match success message from the display server, and displaying the position match success message for the user, wherein the position match success message prompts the user that the sub-picture is matched successfully, the position match success message is transmitted by the display server, when the display server determines that current position of the sub-picture is the same as the original position of the sub-picture.

9. The method according to claim 7, wherein displaying the interactive information for the user comprises:
displaying the interactive information for the user on a pre-specified sub-picture.

10. The method according to claim 7, wherein the interactive information comprises a Uniform Resource Locator (URL), and the method further comprises:
in response to the user's click on the URL, opening a webpage corresponding to the URL.

11. A display server, comprising:
a processor, which is configured to execute instructions stored in a memory, wherein the instructions are configured to:
obtain at least two sub-pictures, original position information and first current position information of each sub-picture in a picture, wherein the picture is configured to display the original position information and the first current position information of each sub-picture in the picture, the at least two sub-pictures are obtained by dividing the picture; the first current position is obtained, after reordering the at least two sub-pictures;
receive second current position information of the at least two sub-pictures from the social application client;
transmit the at least two reordered sub-pictures, and first current position information of the at least two reordered sub-pictures to the social application client;
for a sub-picture of the at least two sub-pictures, when determining that original position information of the sub-picture is the same as current position information of the sub-picture, transmit interactive information related with the information displayed by the picture to the social application client; and,
determine whether second current position of the sub-picture is the same as the original position of the sub-picture;

wherein the original position indicated by the original position information of the sub-picture at least comprises the position of the sub-picture in the picture, when a similarity between the sub-picture and at least one other sub-picture is greater than a set threshold, the original position indicated by the original position information of the sub-picture further comprises the position of the at least one other sub-picture in the picture, wherein when being executed by the processor, the instructions are further configured to:
for a sub-picture of the at least two sub-pictures, under the circumstances that the original position of the sub-picture comprises two or more positions, when the second current position of the sub-picture is the same as any position among the original positions of the sub-picture, determine that the second current position of the sub-picture is the same as the original position of the sub-picture;
for a sub-picture of the at least two sub-pictures, under the circumstances that the original position of the sub-picture comprises one position, when the second current position of the sub-picture is the same as the original position of the sub-picture, determine that the second current position of the sub-picture is the same as the original position of the sub-picture.

12. The server according to claim 11, wherein when being executed by the processor, the instructions are further configured to:
reorder the at least two sub-pictures.

13. The server according to claim 12, wherein when being executed by the processor, the instructions are further configured to:
reorder the remaining sub-pictures of the at least two sub-pictures, except for a one sub-picture with an unchanged position.

14. The server according to claim 12, wherein when being executed by the processor, the instructions are further configured to:
randomly change positions of the at least two sub-pictures, obtain first current position information of each sub-picture;
on the basis of the recorded original position information and first current position information of each sub-picture, respectively determine the shortest path between original position and first current position of a sub-picture among the at least two sub-pictures, and calculate a sum of length of each shortest path;
on the basis of a preset algorithm, determine whether the sum of length of each shortest path is less than a preset first threshold, and is greater than a preset second threshold, when the sum of length of each shortest path is less than the preset first threshold, and is greater than the preset second threshold, proceed with the operation of randomly changing the positions of the at least two sub-pictures, and subsequent operations.

15. The server according to claim 11, wherein when being executed by the processor, the instructions are further configured to:
for each sub-picture, record the original position information and first current position information of each sub-picture;
update the recorded current position information of the sub-picture to be the second current position information.

* * * * *